(12) United States Patent
Vinogradov et al.

(10) Patent No.: US 8,201,740 B2
(45) Date of Patent: Jun. 19, 2012

(54) IMAGING READER FOR AND METHOD OF IMPROVING VISIBILITY OF AIMING PATTERN

(75) Inventors: Igor Vinogradov, New York, NY (US); Miroslav Trajkovic, Centereach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 582 days.

(21) Appl. No.: 11/906,090

(22) Filed: Sep. 28, 2007

(65) Prior Publication Data

US 2009/0084851 A1   Apr. 2, 2009

(51) Int. Cl.
*G06K 7/10* (2006.01)
(52) U.S. Cl. ........................................................ 235/454
(58) Field of Classification Search ............. 235/462.11, 235/472.01, 454, 462.06, 462.21, 462.42
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,621,203 A | 4/1997 | Swartz et al. | |
| 5,703,349 A | 12/1997 | Meyerson et al. | |
| 5,756,981 A * | 5/1998 | Roustaei et al. | 235/462.42 |
| 6,398,112 B1 | 6/2002 | Li et al. | |
| 2003/0006290 A1* | 1/2003 | Hussey et al. | 235/472.01 |
| 2004/0069855 A1* | 4/2004 | Patel et al. | 235/472.01 |
| 2007/0102520 A1* | 5/2007 | Carlson et al. | 235/454 |
| 2007/0164111 A1* | 7/2007 | Wang et al. | 235/454 |

FOREIGN PATENT DOCUMENTS

WO   WO 99/64980   12/1999

OTHER PUBLICATIONS

International Preliminary Report on Patentability and the Written Opinion of the International Search Authority for International Application No. PCT/US2008/076999 mailed Apr. 8, 2010.
International Search Report mailed on Dec. 12, 2008 for International Application No. PCT/US2008/076999.

* cited by examiner

*Primary Examiner* — Seung Lee
(74) *Attorney, Agent, or Firm* — Nong-Qiang Fan

(57) ABSTRACT

An aiming light assembly supported by a mobile imaging reader projects an aiming light pattern on a symbol. A controller modulates the aiming light pattern to render the aiming light pattern more visibly discernible to an operator, especially in a brightly lit ambient environment, to enable the operator to position the aiming light pattern on the symbol prior to reading.

23 Claims, 2 Drawing Sheets

IMAGING READER FOR AND METHOD OF IMPROVING VISIBILITY OF AIMING PATTERN

BACKGROUND OF THE INVENTION

Solid-state imaging readers have been used in supermarkets, warehouse clubs, department stores, and other kinds of retailers to electro-optically read one-dimensional bar code symbols, particularly of the Universal Product Code (UPC) type, on products to be purchased, each symbol having a row of bars and spaces spaced apart along one direction, and also for processing two-dimensional symbols, such as Code 49, on such products, as well as other items. The structure of Code 49, which introduced the concept of vertically stacking a plurality of rows of bar and space patterns in a single symbol, is described in U.S. Pat. No. 4,794,239. Another two-dimensional code structure for increasing the amount of data that can be represented or stored on a given amount of surface area is known as PDF417 and is described in U.S. Pat. No. 5,304,786.

A typical imaging reader has a one- or two-dimensional array of cells or photosensors, which correspond to image elements or pixels in a field of view of the array, and is similar to that used in a digital camera. The array may be a one- or two-dimensional charge coupled device (CCD) or a complementary metal oxide semiconductor (CMOS) device, together with associated circuits for producing electronic signals corresponding to a one- or two-dimensional array of pixel information over the field of view. A microprocessor is used to analyze and decode the captured image of the symbol. The array may be used for capturing a monochrome image of a symbol as, for example, disclosed in U.S. Pat. No. 5,703,349. The array may have multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

Yet, the use of imaging readers, especially hand-held movable readers, for reading symbols has proven to be challenging. An operator cannot see exactly whether the symbol is within the field of view of the array during reading. The symbol must lay preferably entirely within the field of view to be successfully decoded and read. It is not uncommon for the operator to repeatedly move the portable reader in multiple directions and repeatedly aim the portable reader at a single symbol several times before an indicator advises the operator that the symbol has been successfully read, thereby slowing down transaction processing and reducing productivity.

This blind aiming at the symbol is easier if the symbol is relatively small or is far away from the reader, because then the chances that the symbol will lay within the field of view are greater. However, in most cases, this blind aiming at the symbol is difficult to overcome, especially when the position and orientation of the symbol are variable. The symbol may be oriented in a "picket fence" orientation, in which the elongated parallel bars of the one-dimensional UPC symbol are vertical, or in a "ladder" orientation, in which the symbol bars are horizontal, or at any orientation angle in between.

To help overcome this blind aiming problem, an aiming light arrangement is typically mounted in the reader, for projecting a visible aiming light pattern to visually target the symbol and, thus, advise the operator which way the reader is to be moved in order to position the aiming light pattern on the symbol, typically at the center thereof, prior to reading. As advantageous as such aiming light arrangements are, they have proven to be less than satisfactory in certain situations. For example, in a brightly lit environment illuminated by indoor lighting of high intensity, or by outdoor lighting such as sunlight, it is often difficult for the operator to see the aiming pattern, because the aiming pattern is "drowned" out by the bright ambient light.

To improve the visibility of the aiming pattern, lasers are sometimes used as the sources for the aiming lights. A laser beam of high output power is desirable for an increased ambient light immunity and greater aiming pattern visibility. However, for safety reasons, there are regulations concerning the maximum level of laser beam output power that can be emitted from an electro-optical reader. For example, a Class II laser is limited to a maximum laser output power of 1 milliwatt if there is no laser shut-off feature. If there is a laser shut-off feature, then a higher power in the emitted laser beam is permitted. However, it is not always possible to increase the laser beam output power enough to have an aiming light pattern that is easily visibly discernible by the operator, especially in a brightly lit environment, due to laser safety restrictions.

SUMMARY OF THE INVENTION

One feature of the present invention resides, briefly stated, in a reader for, and a method of, electro-optically reading a target, especially one-dimensional symbols and/or two-dimensional symbols. The reader is preferably embodied as a portable, point-of-transaction, gun-shaped, hand-held housing, but could be embodied as a hand-held, box-shaped housing, or the like. Prior to reading of the symbols, the reader is brought to, and aimed at, the symbols by an operator. In the preferred embodiment, the reader is installed in a retail establishment, such as a supermarket, but can be installed virtually anywhere requiring symbols to be read.

A one- or two-dimensional, solid-state imager under control of a controller is mounted in the reader, and includes an array of image sensors operative for capturing light from a one-dimensional and/or a two-dimensional symbol over a field of view, and for generating an electrical signal indicative of the captured light. The field of view of the imager diverges in an outward direction away from the imager. Preferably, the array is a charge coupled device (CCD) or a complementary metal oxide semiconductor (CMOS) array. An imaging lens is preferably mounted in the reader in front of the imager to focus the captured light onto the imager. The imaging lens causes the field of view to rapidly widen at a steeper angle of divergence.

The imager may be associated with a high-speed strobe illuminator under control of the controller to enable the image of the symbol to be acquired in a very short period of time, for example, on the order of 500 microseconds, so that the symbol image is not blurred even if there is relative motion between the imager and the symbol. The strobe illumination is preferably brighter than ambient illumination. The illumination can also be continuous. The imager captures light over an exposure time period, also under the control of the controller. A short exposure time also prevents image blurring. The controller is also operative for processing the electrical signal into data indicative of the symbol being read.

In accordance with one feature of this invention, an aiming light assembly is supported by the housing, and is operative for projecting an aiming light pattern on the symbol. The aiming light assembly is also operatively connected to the controller, for modulating the aiming light pattern to render the aiming light pattern more visibly discernible to the operator to enable the operator to position the aiming light pattern on the symbol prior to reading. The aiming light pattern is turned off during reading. A modulated or flashing light pattern is more discernible to the human eye than a continuous or constant light pattern. Preferably, the controller modulates the aiming light pattern at a blink frequency in a range of from one to four Hertz.

In a preferred embodiment, the controller is operative for determining an ambient light condition above a threshold light intensity, and for modulating the aiming light pattern only when the ambient light condition determined by the controller is above the threshold light intensity. The threshold light intensity is the level of ambient light below which the aiming light pattern becomes difficult to visually discern. Thus, the aiming light pattern is preferably not modulated under low ambient light where there is less of a necessity to make the aiming light pattern more noticeable. Alternatively, rather than not modulating the aiming light pattern under low ambient light conditions, the aiming light pattern can be modulated at a high blink frequency, e.g., above 25 Hertz, and at a low duty cycle, such that the operator will not notice any change in the intensity of the aiming light pattern due to the integration of the human eye. This is especially useful for some operators who may find the modulated aiming light pattern objectionable. One way to determine a brightly lit environment is to have the controller determine a gain of the imager over a time period.

The aiming light assembly preferably includes one or a plurality of light sources and one or a plurality of pattern shaping optical elements, such as diffractive or refractive optical elements. One or each light source is advantageously a laser. In order to modulate the aiming light pattern, the controller pulses one or each laser in a blinking mode at a duty cycle, for example, on the order of 50 percent. This allows the output power of one or each laser to be increased for each pulse, thereby increasing the brightness of the aiming light pattern, but the average output power is kept below safety restriction levels due to the duty cycle. In addition, the working lifetime of each laser is increased due to the duty cycle.

The method of electro-optically reading symbols advantageously comprises the steps of moving a housing by an operator; capturing light over a field of view from a symbol, and generating an electrical signal indicative of the captured light; processing the electrical signal into data indicative of the symbol being read; and projecting an aiming light pattern on the symbol, and modulating the aiming light pattern to render the aiming light pattern more visibly discernible to the operator to enable the operator to position the aiming light pattern on the symbol prior to reading.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
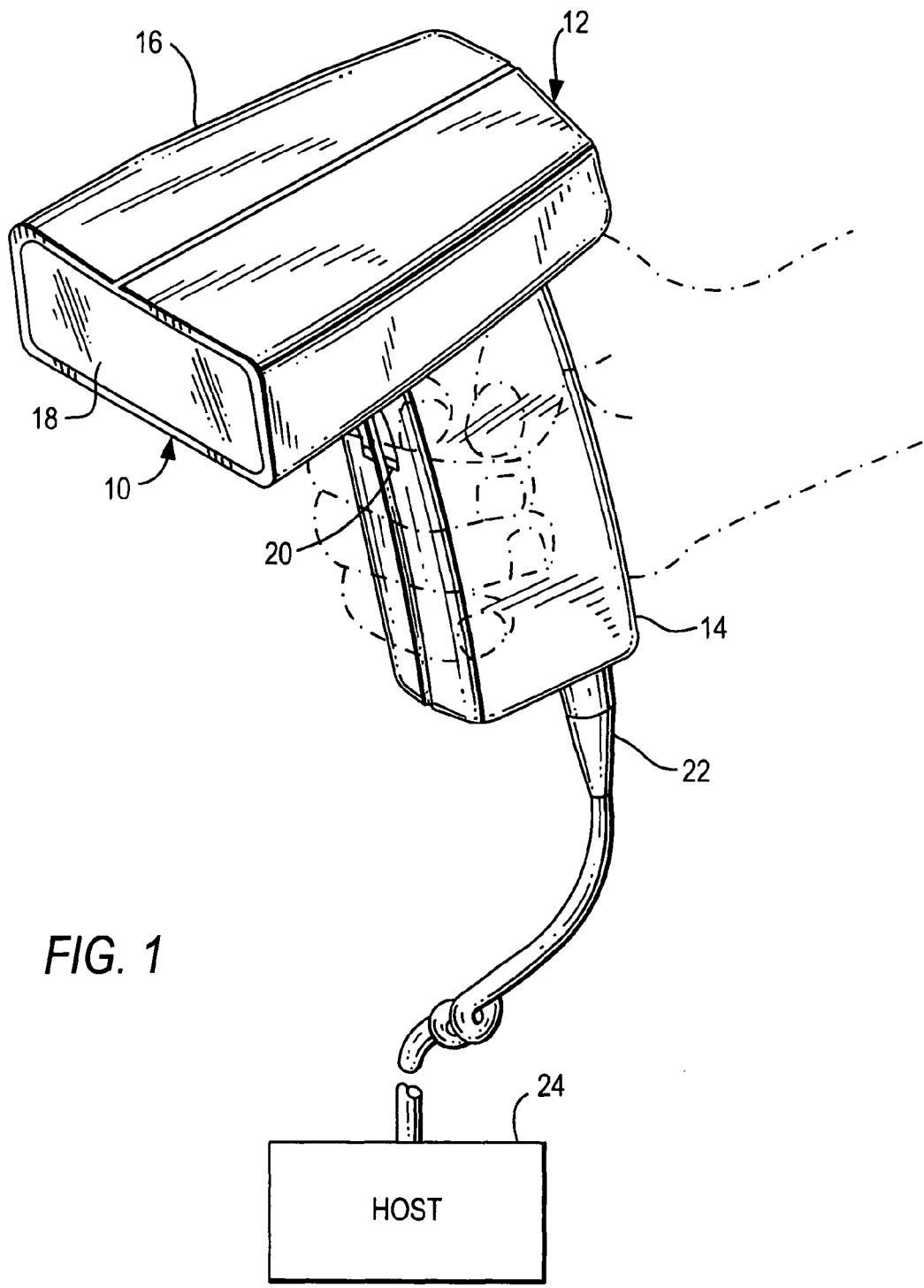
FIG. 1 is a perspective view of an imaging reader for electro-optically reading symbols by image capture in accordance with this invention.

Reference numeral 10 in FIG. 1 generally identifies a handheld imaging reader for electro-optically reading symbols or like indicia on products or like targets. The reader 10 includes a housing 12 in which an aiming light assembly, as described in detail below in accordance with this invention, is incorporated. The housing 12 includes a generally elongated handle or lower handgrip portion 14 and a barrel or upper body portion 16 having a front end at which a light-transmissive window 18 is located. The cross-sectional dimensions and overall size of the handle are such that the reader can conveniently be held in an operator's hand.

The body and handle portions may be constructed of a lightweight, resilient, shock-resistant, self-supporting material such as a synthetic plastic material. The plastic housing may be injection molded, but can be vacuum-formed or blow-molded to form a thin hollow shell which bounds an interior space whose volume is sufficient to contain the various components of this invention.

A manually actuatable trigger 20 is mounted in a moving relationship on the handle 14 in a forward facing region of the reader. The operator's forefinger is used to actuate the reader to initiate reading by depressing the trigger. An optional flexible electrical cable 22 is provided to connect the reader to a remote host 24. The cable may also provide electrical power to the reader. The host 24 has access to a database for retrieval of information. If the cable 22 is not used, then a wireless link to transfer data may be provided between the reader 10 and the host 24, and an on-board battery, typically within the handle, can be used to supply electrical power.

An alternative embodiment incorporates a display and a keyboard. Data obtained from reading the symbols is then either transferred to the remote host 24 in real time, or saved to an internal memory such that the stored data can be transferred to the host 24 at a later time in batch mode.

Figure 2:
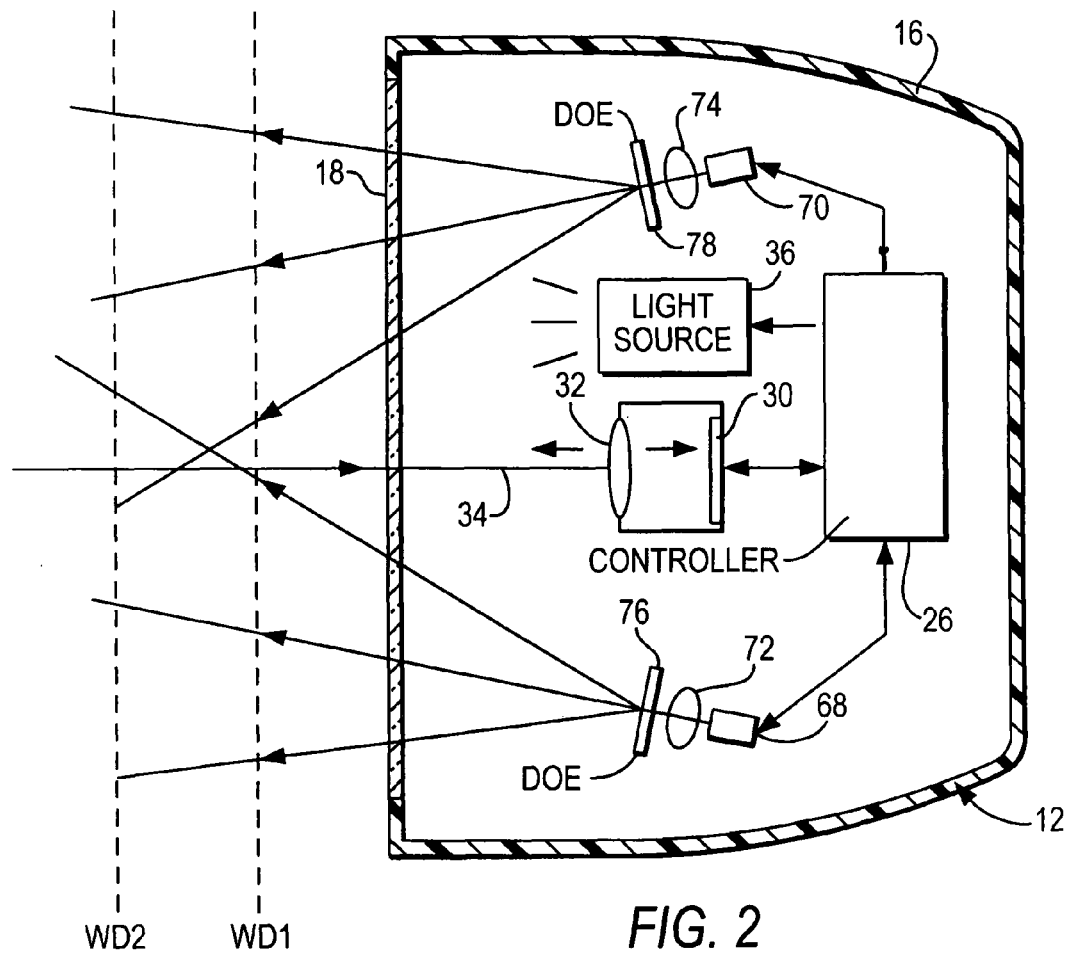
FIG. 2 is a diagrammatic plan view of components within the reader of FIG. 1 including components of an aiming light arrangement.

A solid-state imager 30, as shown in the interior plan view of FIG. 2, is mounted within the housing 12 and preferably is a one- or two-dimensional, charge coupled device (CCD) or complementary metal oxide semiconductor (CMOS) array of cells or sensors operative for capturing light over its field of view from a symbol through the window 18 and focused by an imaging lens assembly 32. The sensors produce electrical signals corresponding to a one- and/or two-dimensional array of pixel information for an image of the symbol. The electrical signals are processed by a controller or microprocessor 26 into data indicative of the symbol being read. The imager 30 and imaging lens assembly 32 are preferably aligned along a centerline or an optical axis 34 generally centrally located within the body portion 16. As shown in FIG. 2, the imaging lens assembly 32 has a fixed focus and enables image capture over a range of working distances between a close-in distance WD1 and a far-out distance WD2 relative to the window 18. The imager and imaging lens assembly are capable of acquiring a full image of the symbol in lighting conditions from two lux to direct sunlight. Exposure time is about 15 milliseconds and controlled by the controller 26. Resolution of the array can be of various sizes although a VGA resolution of 640×480 pixels is preferred.

An illumination or light source 36 for the imager 30 is also provided to provide an illumination field for the imager. The source 36 preferably constitutes one or a plurality of light emitting diodes energized by power supply lines in the cable 22, or via the on-board battery. The source 36 is preferably pulsed in synchronism with the imager 30 under the control of the controller 26.

As described so far, many operators have difficulty using the described hand-held movable reader, because they cannot see exactly whether the symbol is within the field of view of the imager array 30 during reading. The symbol must lay preferably entirely within the field of view to be successfully decoded and read. Many operators need to repeatedly move the reader in multiple directions and repeatedly aim the reader at a single symbol several times before an indicator advises the operator that the symbol has been successfully read, thereby slowing down transaction processing and reducing productivity.

Figure 3:
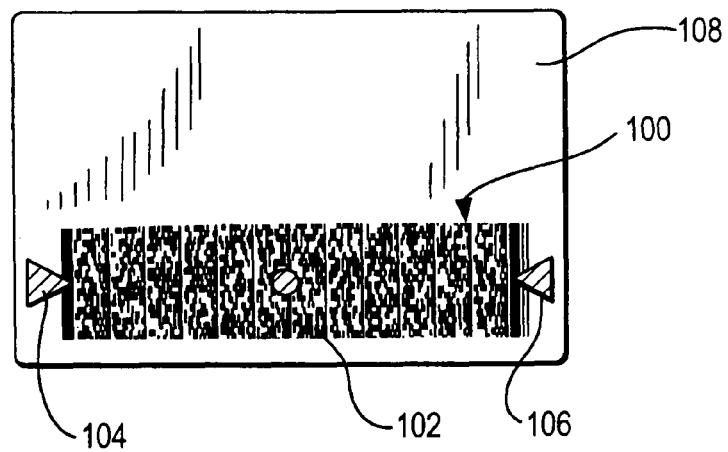
FIG. 3 is a front view of a two-dimensional symbol illuminated by the aiming light arrangement of FIG. 2 prior to reading.

In accordance with one feature of this invention, an aiming light assembly is supported by the housing 12, and is operative for projecting an aiming light pattern, such as light markers 102, 104, and 106, as depicted in FIG. 3, on a symbol, such as a two-dimensional symbol 100 printed on a sheet medium, such as the back of a driver's license 108. Markers 104 and 106 are advantageously formed as inwardly facing arrowheads to bracket opposite ends of the symbol. Marker 102 is advantageously formed as a generally circular spot for placement at the center of the symbol. Other aiming light patterns for framing the symbol are contemplated. The pattern may consist solely of the spot 102 or crosshairs.

The aiming light assembly includes one or a plurality of light projectors for projecting the markers 102, 104, and 106 onto the symbol 100. One or each projector includes a light source, such as a laser 68, 70, a focusing lens 72, 74, and a pattern shaping optical element, such as a diffractive optical element (DOE) 76, 78, or a refractive optical element (ROE). The focused light passing through a respective DOE forms multiple diverging beamlets, as described in U.S. Pat. No. 6,340,114, which exit the window 18 and project continuous lines or rows of spots arrayed in a pattern of the respective markers 102, 104, and 106 on the symbol 100 throughout the working distance range. A detailed analysis of a refractive optical element or lens suitable for use in shaping a laser beam into an aiming light pattern is found in U.S. Patent Publication No. US 2005/0284942 A1, published Dec. 29, 2005 (U.S. patent application Ser. No. 10/879,333, filed Jun. 29, 2004) to Gurevich, et al. This published application is assigned to the assignee of the present application and is incorporated herein in its entirety by reference. Another detailed analysis of a diffractive optical element or lens for use in shaping a laser beam is found in U.S. Pat. No. 6,021,106, issued Feb. 1, 2000 to Welch, et al.

Diffractive/refractive optics creates a bright, crisp aiming light pattern which provides ready feedback to the operator regarding the direction in which the housing 12 and, hence, the field of view is to be moved in order to position the symbol entirely within the field of view, as described below. In a preferred embodiment, each laser light source has an output power on the order of 5 milliwatts and a wavelength of 650 nanometers. Instead of diffractive/refractive optics, it is also possible to use masks to project the aiming light pattern onto the symbol.

As described above, in a brightly lit environment illuminated by indoor lighting of high intensity, or by outdoor lighting such as sunlight, it is often difficult for the operator to see the aiming light pattern despite the use of diffractive/refractive optics, because the aiming pattern is "drowned" out by the bright ambient light. Hence, the aiming light assembly is also operatively connected to the controller 26, for modulating the aiming light pattern to render the aiming light pattern more visibly discernible and noticeable to the operator to enable the operator to position the aiming light pattern on the symbol prior to reading. The aiming light pattern is turned off during reading. A modulated or flashing light pattern is more discernible to the human eye than a continuous or constant light pattern. Preferably, the controller 26 modulates the aiming light pattern at a blink frequency in a range of from one to four Hertz, although other frequencies could be employed. A set of different frequencies may indicate different modes of operation, e.g., fast blinking mode or slow blinking mode, to the operator for additional means of communication between the operator and the reader.

In a preferred embodiment, the controller 26 is operative for determining an ambient light condition above a threshold light intensity, and for modulating the aiming light pattern only when the ambient light condition determined by the controller 26 is above the threshold light intensity. Thus, the aiming light pattern is preferably not modulated under low ambient light where there is less of a necessity to make the aiming light pattern more noticeable. This is especially useful for some operators who may find the modulated aiming light pattern objectionable. Alternatively, rather than not modulating the aiming light pattern under low ambient light conditions, the aiming light pattern can be modulated at a high blink frequency, e.g., above 25 Hertz, and at a low duty cycle, such that the operator will not notice any change in the intensity of the aiming light pattern due to the integration of the human eye.

One way to determine a brightly lit environment is to have the controller 26 determine a gain of the imager over a time period. Another way is to employ a separate photodetector for sensing the ambient light level, and to have the controller modulate the aiming light pattern either only when the photodetector senses the ambient light to be above a predetermined threshold level, or to have the controller modulate the aiming light pattern relatively slowly when the photodetector senses the ambient light to be above a predetermined threshold level and relatively rapidly when the photodetector senses the ambient light to be below the predetermined threshold level.

In order to modulate the aiming light pattern, the controller pulses one or each laser at a duty cycle, for example, on the order of 50 percent. This allows the output power of one or each laser to be increased for each pulse, thereby increasing the brightness of the aiming light pattern, but the average output power is kept below safety restriction levels due to the duty cycle. For example, if the duty cycle is fifty percent, then the output laser power within each pulse can be doubled, thereby increasing the visibility of the aiming light pattern by a factor of two.

In use, the operator points the reader 10 at the symbol 100 to be read and manually depresses the trigger 20 to initiate reading. The controller 26 activates the imager 30 and initially determines whether the ambient light level is low or high. If the ambient light level is high, then the controller 26 pulses the aiming lasers 68, 70 to project the modulated aiming light pattern with an increased visibility on the symbol to visually prompt the operator to shift the housing 16 and, hence, the field of view until the symbol is entirely within the shifted field of view. Once the symbol is entirely within the field of view, the controller 26 activates the illumination source 36, and the illuminated symbol can be successfully decoded by the controller 26, and an indicator will so advise the operator. Preferably, each aiming laser 68, 70 is deactivated during the reading of the symbol. If the ambient light level is low, then the controller 26 can either not pulse the lasers 68, 70, because the aiming light pattern, when unmodulated, can be more readily seen by the operator in the dimly lit environment, or the controller 26 can more rapidly pulse the lasers 68, 70 to create an aiming light pattern that appears not to be varying in intensity due to human eye integration.

It will be understood that each of the elements described above, or two or more together, also may find a useful application in other types of constructions differing from the types described above. Thus, readers having different configurations can be used.

While the invention has been illustrated and described as improving the visibility of an aiming light pattern projected from an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

We claim:

1. A reader for electro-optically reading symbols, comprising:
   a housing movable by an operator;
   a solid-state imager supported by the housing, for capturing light over a field of view from a symbol, and for generating an electrical signal indicative of the captured light;
   an illumination assembly for providing an illumination field for the solid-state imager;
   a controller supported by the housing, for processing the electrical signal into data indicative of the symbol being read; and
   an aiming light assembly supported by the housing for projecting an aiming light pattern on the symbol, and operatively connected to the controller, for modulating the aiming light pattern at a modulation frequency that is less than twenty five Hertz to enable the operator to position the aiming light pattern on the symbol prior to reading, wherein the aiming light assembly includes a pattern shaping optical element comprising at least one of a diffractive optical element (DOE) and a refractive optical element (ROE).

2. The reader of claim 1, wherein the controller is operative for determining an ambient light condition above a threshold light intensity, and for modulating the aiming light pattern only when the ambient light condition determined by the controller is above the threshold light intensity.

3. The reader of claim 2, wherein the controller determines a gain of the imager over a time period.

4. The reader of claim 1, wherein the aiming light assembly includes a light source and a pattern shaping optical element.

5. The reader of claim 4, wherein the light source is a laser.

6. The reader of claim 5, wherein the controller pulses the laser at a duty cycle.

7. The reader of claim 1, wherein the imager is one of a charge coupled device and a complementary metal oxide silicon device, and wherein the symbol is one of a one-dimensional symbol and a two-dimensional symbol.

8. A reader for electro-optically reading symbols, comprising:
   a housing movable by an operator;
   a solid-state imager supported by the housing, for capturing light over a field of view from a symbol, and for generating an electrical signal indicative of the captured light;
   an illumination assembly for providing an illumination field for the solid-state imager;
   a controller supported by the housing, for processing the electrical signal into data indicative of the symbol being read;
   an aiming light assembly supported by the housing for projecting an aiming light pattern on the symbol, and operatively connected to the controller, for modulating the aiming light pattern at a modulation frequency that is perceivable to the operator to enable the operator to position the aiming light pattern on the symbol prior to reading, wherein the aiming light assembly includes a pattern shaping optical element comprising at least one of a diffractive optical element (DOE) and a refractive optical element (ROE); and
   wherein the controller modulates the aiming light pattern at a frequency in a range of from one to four Hertz.

9. A reader for electro-optically reading symbols, comprising:
   a housing movable by an operator;
   a solid-state imager supported by the housing, for capturing light over a field of view from a symbol, and for generating an electrical signal indicative of the captured light;
   an illumination assembly for providing an illumination field for the solid-state imager;
   a controller supported by the housing, for processing the electrical signal into data indicative of the symbol being read;
   an aiming light assembly supported by the housing for projecting an aiming light pattern on the symbol, and operatively connected to the controller, for modulating the aiming light pattern at a modulation frequency that is perceivable to the operator to enable the operator to position the aiming light pattern on the symbol prior to reading, wherein the aiming light assembly includes a pattern shaping optical element comprising at least one of a diffractive optical element (DOE) and a refractive optical element (ROE); and
   wherein the controller is operative for determining an ambient light condition above a threshold light intensity, and for modulating the aiming light pattern at a modulation frequency that is less or equal to four Hertz when the ambient light condition determined by the controller is above the threshold light intensity, and at a relative faster rate when the ambient light condition determined by the controller is below the threshold light intensity.

10. A reader for electro-optically reading symbols, comprising:
    housing means movable by an operator;
    imaging means supported by the housing means, for capturing light over a field of view from a symbol, and for generating an electrical signal indicative of the captured light;
    illumination means for providing an illumination field for the imaging means;

control means supported by the housing means, for processing the electrical signal into data indicative of the symbol being read; and aiming means supported by the housing means, for projecting an aiming light pattern on the symbol, and operatively connected to the control means, for modulating the aiming light pattern at a modulation frequency that is less than twenty five Hertz to enable the operator to position the aiming light pattern on the symbol prior to reading, wherein the aiming means includes a pattern shaping optical element comprising at least one of a diffractive optical element (DOE) and a refractive optical element (ROE).

11. An arrangement for aiming at symbols to be electro-optically read, comprising:

a movable solid-state imager for capturing light over a field of view from a symbol, and for generating an electrical signal indicative of the captured light;

an illumination assembly for providing an illumination field for the movable solid-state imager;

a controller for processing the electrical signal into data indicative of the symbol being read; and an aiming light assembly for projecting an aiming light pattern on the symbol, and operatively connected to the controller for modulating the aiming light pattern at a modulation frequency that is less than twenty five Hertz to enable the operator to position the aiming light pattern on the symbol prior to reading, wherein the aiming light assembly includes a pattern shaping optical element comprising at least one of a diffractive optical element (DOE) and a refractive optical element (ROE).

12. The arrangement of claim 11, wherein the controller is operative for determining an ambient light condition above a threshold light intensity, and for modulating the aiming light pattern only when the ambient light condition determined by the controller is above the threshold light intensity.

13. An arrangement for aiming at symbols to be electro-optically read, comprising:

a movable solid-state imager for capturing light over a field of view from a symbol, and for generating an electrical signal indicative of the captured light;

an illumination assembly for providing an illumination field for the movable solid-state imager;

a controller for processing the electrical signal into data indicative of the symbol being read;

an aiming light assembly for projecting an aiming light pattern on the symbol, and operatively connected to the controller for modulating the aiming light pattern at a modulation frequency that is perceivable to the operator to enable the operator to position the aiming light pattern on the symbol prior to reading, wherein the aiming light assembly includes a pattern shaping optical element comprising at least one of a diffractive optical element (DOE) and a refractive optical element (ROE); and wherein the controller is operative for determining an ambient light condition above a threshold light intensity, and for modulating the aiming light pattern at a relative slower rate when the ambient light condition determined by the controller is above the threshold light intensity, and at a modulation frequency that is less or equal to four Hertz when the ambient light condition determined by the controller is below the threshold light intensity.

14. A method of electro-optically reading symbols, comprising the steps of:

moving a housing by an operator;

capturing light over a field of view from a symbol, and generating an electrical signal indicative of the captured light;

processing the electrical signal into data indicative of the symbol being read; and projecting an aiming light pattern on the symbol through a pattern shaping optical element including at least one of a diffractive optical element (DOE) and a refractive optical element (ROE), and modulating the aiming light pattern at a modulation frequency that is less than twenty five Hertz to enable the operator to position the aiming light pattern on the symbol prior to reading.

15. The method of claim 14, and determining an ambient light condition above a threshold light intensity, and wherein the modulating step is performed by modulating the aiming light pattern only when the ambient light condition is above the threshold light intensity.

16. The method of claim 15, and determining a gain of the electrical signal over a time period.

17. The method of claim 14, wherein the projecting step is performed by a light source and a pattern shaping optical element.

18. The method of claim 17, and configuring the light source as a laser.

19. The method of claim 18, wherein the modulating step is performed by pulsing the laser at a duty cycle.

20. The method of claim 14, and configuring the imager as one of a charge coupled device and a complementary metal oxide silicon device, and configuring the symbol as one of a one-dimensional symbol and a two-dimensional symbol.

21. A method of electro-optically reading symbols, comprising the steps of:

moving a housing by an operator;

capturing light over a field of view from a symbol, and generating an electrical signal indicative of the captured light;

processing the electrical signal into data indicative of the symbol being read;

projecting an aiming light pattern on the symbol through a pattern shaping optical element including at least one of a diffractive optical element (DOE) and a refractive optical element (ROE), and modulating the aiming light pattern at a modulation frequency that is perceivable to the operator to enable the operator to position the aiming light pattern on the symbol prior to reading; and wherein the modulating step is performed by modulating the aiming light pattern at a frequency in a range of from one to four Hertz.

22. A method of electro-optically reading symbols, comprising the steps of:

moving a housing by an operator;

capturing light over a field of view from a symbol, and generating an electrical signal indicative of the captured light;

determining an ambient light condition above a threshold light intensity, and wherein the modulating step is performed by modulating the aiming light pattern at a relative slower rate when the ambient light condition is above the threshold light intensity, and at a modulation frequency that is less or equal to four Hertz when the ambient light condition is below the threshold light intensity.

23. A method of aiming at symbols to be electro-optically read, comprising the steps of:

capturing light over a field of view from a symbol, and generating an electrical signal indicative of the captured light;

processing the electrical signal into data indicative of the symbol being read; and projecting an aiming light pattern on the symbol through a pattern shaping optical element including at least one of a diffractive optical element (DOE) and a refractive optical element (ROE), and modulating the aiming light pattern at a modulation frequency that is less than twenty five Hertz to enable the operator to position the aiming light pattern on the symbol prior to reading.

* * * * *

UNITED STATES PATENT AND TRADEMARK OFFICE
CERTIFICATE OF CORRECTION

| | | |
|---|---|---|
| PATENT NO. | : 8,201,740 B2 | Page 1 of 1 |
| APPLICATION NO. | : 11/906090 | |
| DATED | : June 19, 2012 | |
| INVENTOR(S) | : Vinogradov et al. | |

It is certified that error appears in the above-identified patent and that said Letters Patent is hereby corrected as shown below:

In Column 10, Line 55, in Claim 22, insert -- processing the electrical signal into data indicative of the symbol being read;
projecting an aiming light pattern on the symbol through a pattern shaping optical element including at least one of a diffractive optical element (DOE) and a refractive optical element (ROE), and modulating the aiming light pattern at a modulation frequency that is perceivable to the operator to enable the operator to position the aiming light pattern on the symbol prior to reading; and --.

Signed and Sealed this
Eighth Day of January, 2013

David J. Kappos
*Director of the United States Patent and Trademark Office*